Dec. 7, 1926.

C. A. PHELPS 1,609,660

CONCRETE PRESSURE PIPE JOINT

Filed Feb. 19, 1925

Witness

Inventor
Claude A. Phelps
by Bair & Freeman Attorneys

Patented Dec. 7, 1926.

1,609,660

UNITED STATES PATENT OFFICE.

CLAUDE A. PHELPS, OF KNOXVILLE, IOWA.

CONCRETE PRESSURE-PIPE JOINT.

Application filed February 19, 1925. Serial No. 10,296.

The purpose of my invention is to provide a concrete pressure pipe joint of practical, cheap and durable construction, which will afford a perfectly tight joint to be used under water or in ordinary construction.

A further purpose is to provide such a joint, which can be easily and efficiently completed on the job.

Another purpose is to provide such a joint, which will withstand a maximum of pressure internally or externally both hydrostatic or imposed loading.

More particularly, it is my purpose to provide sections of concrete pipe, having what I shall call at their ends inverted bell and inverted spigot structures, and provided with annular reinforcing members of definite and particular shape hereinafter more fully set forth.

Another purpose is to provide in such a joint structure adjacent to one end of each section a pouring hole.

Generally, it is my purpose to provide a structure of the kind mentioned having a suitable space for receiving originally molten packing material backed on one side with packed hemp or the like and on the other side by an annular interior concrete ring.

With these and other objects in view, my invention consists in the construction, arrangement and combination of the various parts of my concrete pressure pipe joint, whereby the objects contemplated are attained, as hereinafter more fully set forth, pointed out in my claims, and illustrated in the accompanying drawings, in which:

Figure 1:
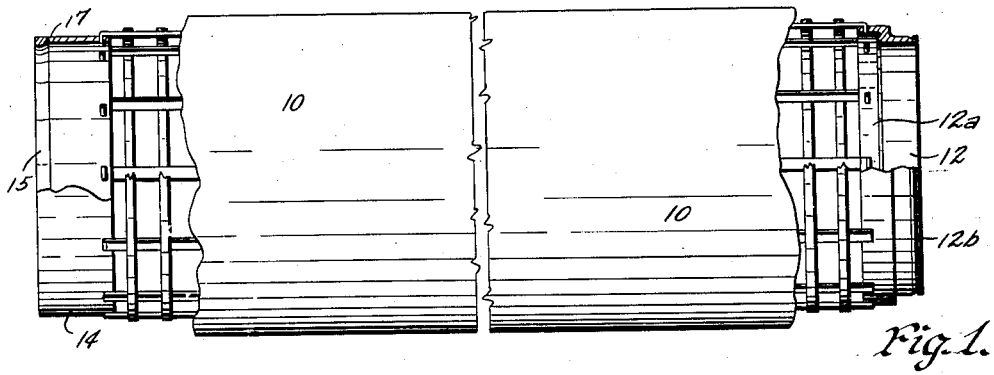
Figure 1 is a horizontal, sectional view of the portion of the pipe line adapted for the use of my joint.

The joint, which is the subject of my invention, is intended for use in pressure lines. The concrete pipe sections employed are, with the exceptions hereinafter referred to, made according to the methods well-known in the art, which in general consist of filling a mold of wood or metal with concrete, in which the reinforcing has previously been assembled.

The drawings herewith filed illustrate the pipe as a finished product having the reinforcing therein.

In the accompanying drawings, I have used the reference numeral 10 to indicate generally the concrete section.

Each section has one end in the form of what I shall call an inverted bell. This shape is given to the end of the section by embedding therein, connected with the reinforcing 11 by the inturned end 11$^a$, a rigid metal cylinder 12 having the offset flange 12$^a$ embedded in the end of the section 10. The shoulder formed by the flange 12$^a$ is curved as at 13 (see Figure 2). The projecting portion of the cylinder 12 has in its outer surface an annular groove 12$^b$.

Figure 2:
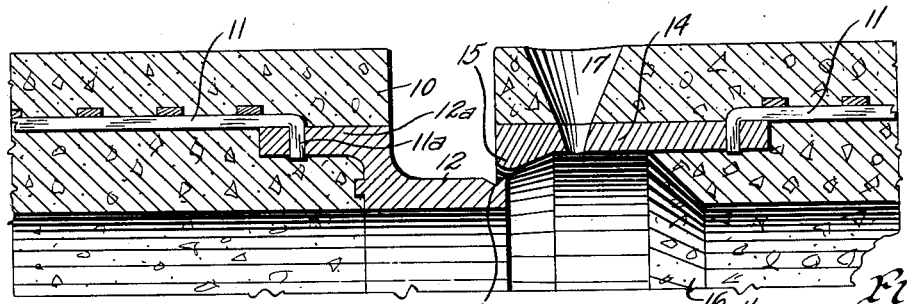
Figure 2 is a vertical, sectional view through portions of pipes the ends of which are constructed for my joint.

The opposite end of the section 10 has the form of what I shall call an inverted spigot. There is inset in this end of the section 10, as illustrated in Figure 2, a rigid metal cylinder 14. On the interior of the cylinder 14 adjacent to the outer end thereof is an inwardly projecting annular raised portion 15. The outer end of the cylinder 14 extends flush with the extreme end of the section 10 as shown. The shoulder at the inner part of the inverted bell is beveled off as at 16.

A funnel-shaped pouring hole 17 extends from the outside of the concrete pipe section 10 at the inverted spigot end thereof through the concrete and through the rigid metal cylinder 14, just inwardly from the annular raised portion 15.

In the outer surface of the projecting portion of the cylinder 12 near the free end thereof is an annular recess or groove 18, shown in Figure 2.

Figure 3:
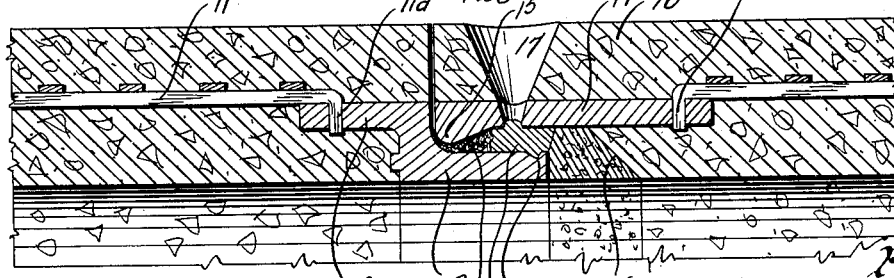
Figure 3 is a vertical, sectional view through a portion of a pipe line having a joint embodying my invention.

In assembling the successive sections of the pipe together, the end of one section illustrated in Figure 2 is slipped over the inverted bell end of the adjacent section, as shown in Figure 2 until the sections are in the position illustrated in Figure 3.

The abutted joint is then completed and made watertight in the following manner:

The workman on the inside of the pipe line places a packing 20 of braided hemp soaked in tar or the like into the space afforded between the cylinders 12 and 14, and tamps it into the form shown in Figure 3, packing it into the space between the inwardly projecting portion 15 and the cylinder 12.

An expanding joint runner is then placed in the groove formed by the shoulder 16, and the adjacent end of the cylinder 12 for closing the end of the space between the cylinders 12 and 14.

Molten lead or lead substitute is then poured through the pouring hole 17 into the annular space between the cylinders 12 and 14, forming a tight packing ring 19, which naturally adjusts itself and flows into every part of the space for entirely filling the space.

By using the molten packing material and the hemp packing 20, all possibilities of leakage through the joint is eliminated.

The runner is then removed and, if necessary, the ring 19 may be tamped with an ordinary caulking tool.

The groove formed adjacent to the shoulder 16 is then filled with mortar 19ª for hermetically sealing the joint. The pouring hole 17 may be filled, as desired.

Figure 4:
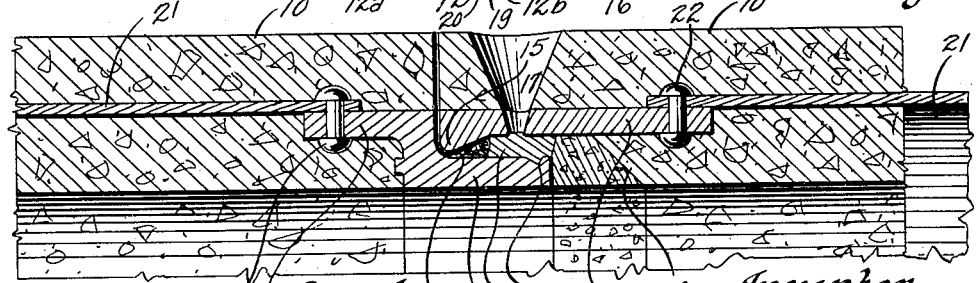
Figure 4 is a view similar to Figure 3 illustrating a slightly modified form of the pipe line and joint for use where the like is to be subjected to extremely high pressure.

In Figure 4, I have shown instead of the reinforcing 10ª a metal cylinder 21 embedded in the section and secured by rivets 22 to the cylinders 12 and 14. This form of pipe is used where the pipe line is to be subject to great pressure.

The advantages of a joint of this type, both in construction and function ultimately performed are important and numerous.

By making the joint in the form herein disclosed and providing a structure which permits the use of molten metal, I am able to produce a joint more efficient for withstanding pressures of all kinds to which the pipe line may be subjected, than is possible with any other known form of concrete pipe joint.

I provide a structure in which the hemp packing may be employed for insuring an absolutely watertight joint. This hemp is packed or held in place by poured metal packing 19. The metal packing 19 naturally adjusts itself for filling all parts of the space into which it is poured.

It will be noted that the metal packing fills the groove 12ᵇ and when the metal packing cools, the two sections of pipe are absolutely locked against longitudinal separation for the reason that the sections can not be pulled apart without shearing the portion of the packing received in the groove 12ᵇ.

The concrete filling 19ª adjacent to the shoulder 16 insures that no part of the corrosive metal shall come into contact with the liquid contents of the pipe line.

No leaded joint furnishes as certain assurance of being watertight as a hemp-packed joint. I therefore have combined the advantage of using the hemp-packed joint with the poured molten metal joint, in which the molten metal hardens and serves to lock the adjacent sections against any separation.

The hemp is packed as tightly as possible before the pouring operation takes place, and then after the pouring operation has occurred and the molten metal has hardened, the end of the molten metal may be tamped for further tightening and packing the hemp 20 and then holding it tightly packed. The metal 19 will retain its position for the forming of the mortar ring.

There are a number of other advantages arising from the form of structure here disclosed The shape of the joint members is such that the pipe line can be given a certain degree of curvature for crossing hills or low places, or for effecting a curve in the pipe line, and yet an efficiently tight joint may be secured between two pipe sections not exactly aligned.

Another important advantage arises from the fact that with the forms of the ends of the sections shown herein, there may be employed standard bell and spigot cast iron pipe end fittings without necessitating any change in the design thereof. This is of great importance in connecting branches and in the providing of air relief valves and the like.

The pipe may be of the length and diameter desired. It will, of course, be understood that the joint is employed in pipe of the larger sizes.

It will be noted that one advantage of a joint of this type arises from the fact that the joint efficiently resists internal pressures, the greater the pressure the tighter the joint.

Furthermore, by being able to finish the joint on the inside, many difficulties which ordinarily occur in completing the job in the ditch are eliminated. A smooth interior finish, which will not restrict flow through the pipe line is readily secured.

The joint may be inspected from the inside entirely around the pipe. This is a matter of great importance when the possibility of such inspection is compared with the methods necessary when the joint must be inspected from the outside, which is very difficult and frequently poorly done.

My joint saves the work and expense of digging the holes for the bells of pipe having bell end joints. In the case of large pipe this is a substantial economy, sometimes running as much as seventy cents per foot in a dry ditch, and much higher where the work must be done in water.

A poured joint is much the best. A poured outside joint will at times blow out due to inside pressure. The joint here described can never blow out because of the arrangement of the hemp or jute packing and the molten metal packing in an interior chamber or compartment as shown.

My joint can be conveniently repaired with a minimum of labor. To repair an outside joint, dirt must be removed entirely around the pipe. My joint may be repaired by digging to the pouring hole, cleaning it out, taking out the motar 1 from the inside, burning out the packing 19 with a torch, and then repeating the necessary parts of the original operations.

The use of a poured metal packing makes it possible to use a lead substitute which when molten and poured is entirely satisfactory and far cheaper than lead. If the metal packing were tamped without melting only a good grade of expensive lead packing can be used.

It is thus seen that I have provided a joint which will be perfectly tight, will withstand great pressure, will permit laying a curved pipe line, is economical in the elimination of the ordinary bell and the use of molten packing, permits accurate inspection, a smooth pipe interior, and quick and convenient repair, and which cannot blow out.

Some changes may be made in the details of the construction and arrangement of my improved joint without departing from the real spirit and purpose of my invention, and it is my intention to cover by my claims, any modified forms of structure or use of mechanical equivalents, which may be reasonably included within their scope.

I claim as my invention:

1. In a structure of the class described, a pipe section having at one end an inverted bell shape as described formed with a shouldered rigid metal cylinder inset therein, provided with an external annular groove near its free end, a second pipe section having at one end an inverted spigot shape substantially as described provided with an inset rigid metal cylinder formed with an interior annular rib or extension adjacent to its open end, the ends of the cylinders being telescoped with the ends of the sections abutting, the second section having a pouring hole as described, a fibrous packing in the space between the cylinders adjacent to the rib, a poured metal packing adjacent to the first packing, and an annular interior filling of mortar, adjacent to said second packing.

2. In a pipe joint structure of the class described, a pipe section having at one end a reduced shouldered extension provided near its open end with an exterior annular groove, a coacting pipe section with an enlarged bore adjacent to its end having near its open end an annular, inwardly projecting rib, said reduced end being received in the enlarged bore, said second pipe section being provided with a pouring hole substantially as described, a fibrous packing received in the space adjacent to said rib, a poured metal packing received in the space between said reduced end and the wall of the enlarged bore of the second section adjacent to the fibrous packing.

3. In a structure of the class described, a pipe section having at one end a reduced extension comprising an annular rigid metal cylinder inset into the end of the section and provided near its open end with an annular exterior groove, a second section having an enlarged bore near its end and having inset in its end a rigid metal cylinder forming the wall of said bore, and having near its open end an annular interior rib, said second section having a pouring hole from its outer surface extending through said last described cylinder, said reduced end being telescoped within said enlarged bore, an annular fibrous packing in the space between the cylinders adjacent to said rib, and a poured metal packing in said space adjacent to the fibrous packing.

4. In a structure of the class described, a pipe section having at one end a reduced extension comprising an annular rigid metal cylinder inset into the end of the section and provided near its open end with an annular exterior groove, a second section having an enlarged bore near its end and having inset in its end a rigid metal cylinder forming the wall of said bore, and having near its open end an annular interior rib, said second section having a pouring hole from its outer surface extending through said last described cylinder, said reduced end being telescoped within said enlarged bore, an annular fibrous packing in the space between the cylinders adjacent to said rib, and a poured metal packing in said space adjacent to the fibrous packing, said enlarged bore being long enough so that when the ends of the sections are telescoped as described, a groove is left adjacent to said reduced end for allowing access to the packing during the making of the joint, and a filler for said last-named groove.

Des Moines, Iowa, February 10, 1925.

CLAUDE A. PHELPS.